(12) United States Patent
Whittingdale

(10) Patent No.: US 6,357,882 B1
(45) Date of Patent: Mar. 19, 2002

(54) REAR VIEW APPARATUS

(76) Inventor: Michael R. Whittingdale, 3 Ingoldsby Cottages, Faircrouch Lane, Wadhurst East Sussex TN5 6PP (GB)

( * ) Notice: Subject to any disclaimer, the term of this patent is extended or adjusted under 35 U.S.C. 154(b) by 0 days.

(21) Appl. No.: 09/416,035

(22) Filed: Oct. 12, 1999

(30) Foreign Application Priority Data

Mar. 11, 1999 (GB) ............................................... 9905595

(51) Int. Cl.⁷ .......................... G02B 5/08; G02B 7/182
(52) U.S. Cl. ...................... 359/855; 359/880; 2/209.14
(58) Field of Search ............................... 359/855, 879, 359/880, 409; 2/209.14, 430, 447; 351/50

(56) References Cited

U.S. PATENT DOCUMENTS

| | | | |
|---|---|---|---|
| 3,594,069 A | * | 7/1971 | Harvey |
| 3,609,015 A | * | 9/1971 | Messinger ................ 359/880 |
| 3,697,156 A | * | 10/1972 | Hyvarinen ................ 359/880 |
| 3,988,058 A | | 10/1976 | Chaney et al. |
| 4,349,246 A | | 9/1982 | Binner |
| 4,651,357 A | | 3/1987 | Gershoni |
| 4,934,806 A | | 6/1990 | Berke |
| 5,076,701 A | | 12/1991 | Greenlaw |
| 5,216,454 A | * | 6/1993 | Berke ........................... 351/43 |
| 5,432,960 A | | 7/1995 | Kraut |
| 5,764,335 A | | 6/1998 | Berke |
| 6,052,832 A | * | 4/2000 | Crompton ...................... 2/422 |

FOREIGN PATENT DOCUMENTS

| | | |
|---|---|---|
| BE | 888108 | 9/1981 |
| DE | 2021288 | 2/1971 |
| DE | 9411732 U | 11/1994 |
| FR | 2540710 | 8/1984 |
| FR | 2631789 | 12/1989 |
| GB | 0757167 | 9/1956 |
| GB | 1005689 | 9/1965 |
| GB | 2097147 A | 10/1982 |

* cited by examiner

Primary Examiner—Cassandra Spyrou
Assistant Examiner—Mark A. Robinson

(57) ABSTRACT

Apparatus for providing a rear view for a user comprising a mirror, a spacer element for spacing the mirror from the user's head and a connector for connecting the spacer element to the user's head wherein the mirror is so constructed and arranged to provide a field of view behind and/or to one side of the user.

9 Claims, 7 Drawing Sheets

REAR VIEW APPARATUS

BACKGROUND OF THE INVENTION

The invention relates in general to a rear view apparatus that is particularly, but not exclusively for cyclists. More particularly, rear view apparatus can be connected to the user's head and is so constructed to provide a field of view behind and to one or each side of the user.

Rear view mirrors are generally known. Commonly, they are provided on the vehicle. One example, U.S. Pat. No. 5,563,742 shows a rear view mirror mounted to a cross bar of a bicycle: the mirror is angled to reflect the field of view through the users legs. If the mirror is mounted to the bicycle it may be subjected to vibration in certain conditions thereby distorting the reflected image. Further, the cyclist is required to view the mirror from a certain position in order for the rear view to be correctly reflected. Thus, the cyclist may be required to move to this particular position during cycling, which is undesirable. If the cyclist changes his riding position then the mirror angle would need to be changed.

An alternative approach is illustrated in U.S. Pat. No. 3,594,069 which shows a motor cycle helmet with an integral rear view mirror that is positioned below the user's eyes and is spaced by sufficient distance to meet the required focal length, thereby to reduce eye strain. The mirror is planar. However, the field of view in such a device is limited because the user is required to turn his head to alter the field of view to cover the areas behind and to each side of the user.

The present invention and its preferred embodiments seek to overcome or at least mitigate the problems of the prior art.

SUMMARY OF THE INVENTION

According to one aspect of the invention there is provided an apparatus for providing a rear view mirror comprising a mirror, a spacer element for spacing the mirror from a user's head and a connector for connecting the spacer element to the user's head wherein the mirror is so constructed and arranged to provide a field of view behind and/or to one side of the user.

In a preferred embodiment, the mirror may be spaced from one of the user's eyes and is angled outwardly so that the user can view through each eye a different portion of said field of view.

According to an optional feature of this aspect of the invention there may further comprise a second mirror adjacent the first mirror, the first and second mirrors diverge outwardly from the user so that the second mirror is adapted to provide a second field of view behind and to the other side of the user.

According to another optional feature of this aspect of the invention, the second mirror spaced from the other one of the user's eyes and is angled outwardly so that the user can view through each eye a different portion of said second field of view.

Preferably, the first and, as the case may be the second mirrors are angled from a notional plane parallel to the user's eyes in the range of 10 to 30 degrees.

Optionally, the first mirror and/or the second mirror is offset from the vertical plane.

According to another aspect of the invention, the spacer element may space the mirror from the user's eyes by a distance in the range of 5 cm to 13 cm. Preferably, the spacing distance is 8 cm.

Optionally, the connector is a helmet and the visor is integral with the helmet. Alternatively, the connector is a helmet and the spacer element is detachably connected to the helmet.

A second aspect of the invention provides a helmet incorporating a rear view apparatus for a user comprising a pair of adjacent mirrors diverging outwardly from the user and a spacer element for spacing the pair of mirrors from the user, wherein each mirror is spaced from the user's eyes the user can view through each eye a different portion of the field of view reflected through each mirror.

According to an optional feature of either aspect of the invention, the spacer element may be provided by a visor extending forward from a position above the user's eyes.

BRIEF DESCRIPTION OF THE DRAWINGS

Embodiments of the invention will now be described, by way of example only, with reference to the accompanying drawings in which.

DETAILED DESCRIPTION OF THE PREFERRED EMBODIMENTS

Figure 1:
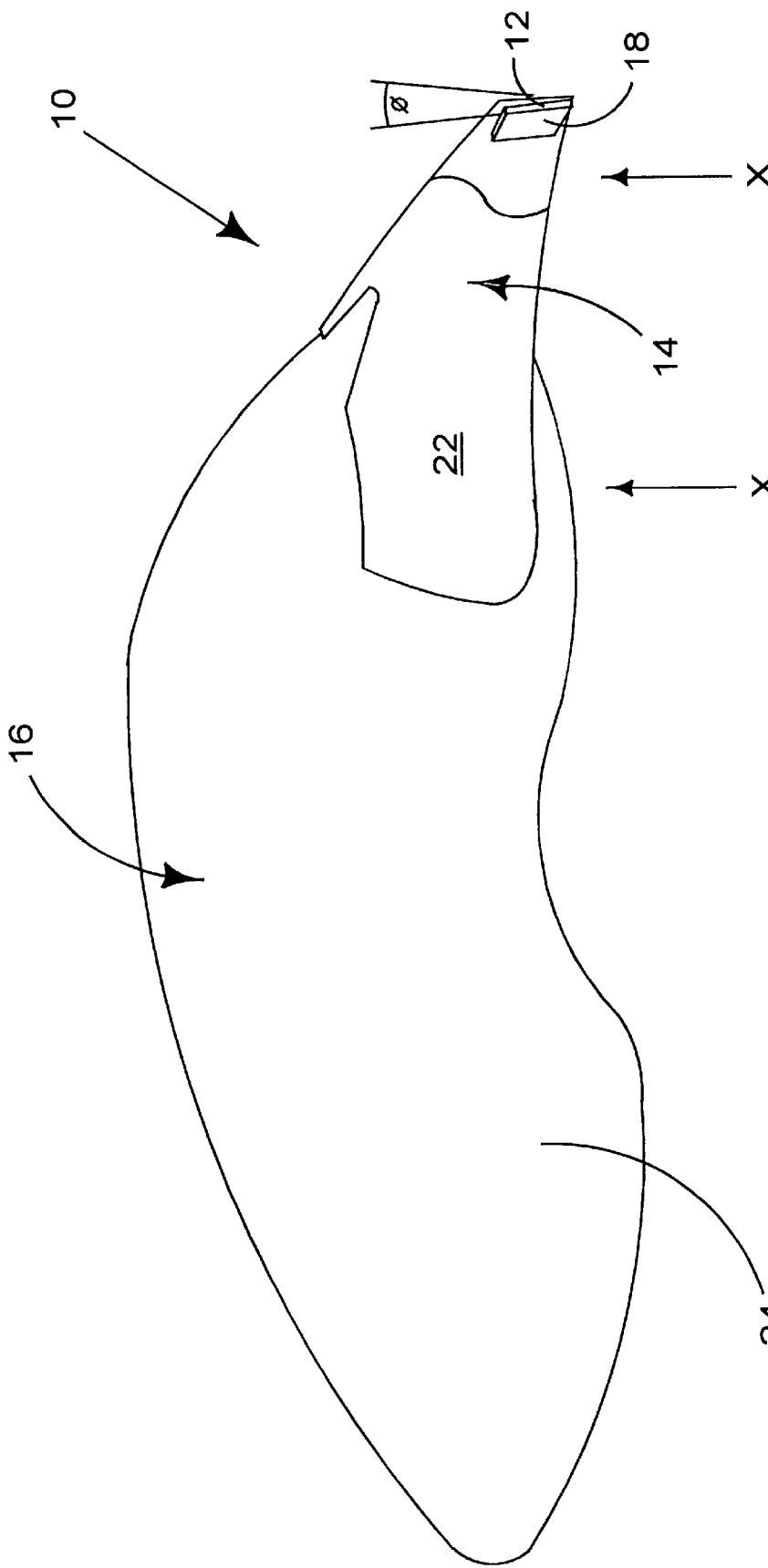
FIG. 1 illustrates a side elevation of a helmet incorporating the preferred embodiment of the invention.
Figure 2:
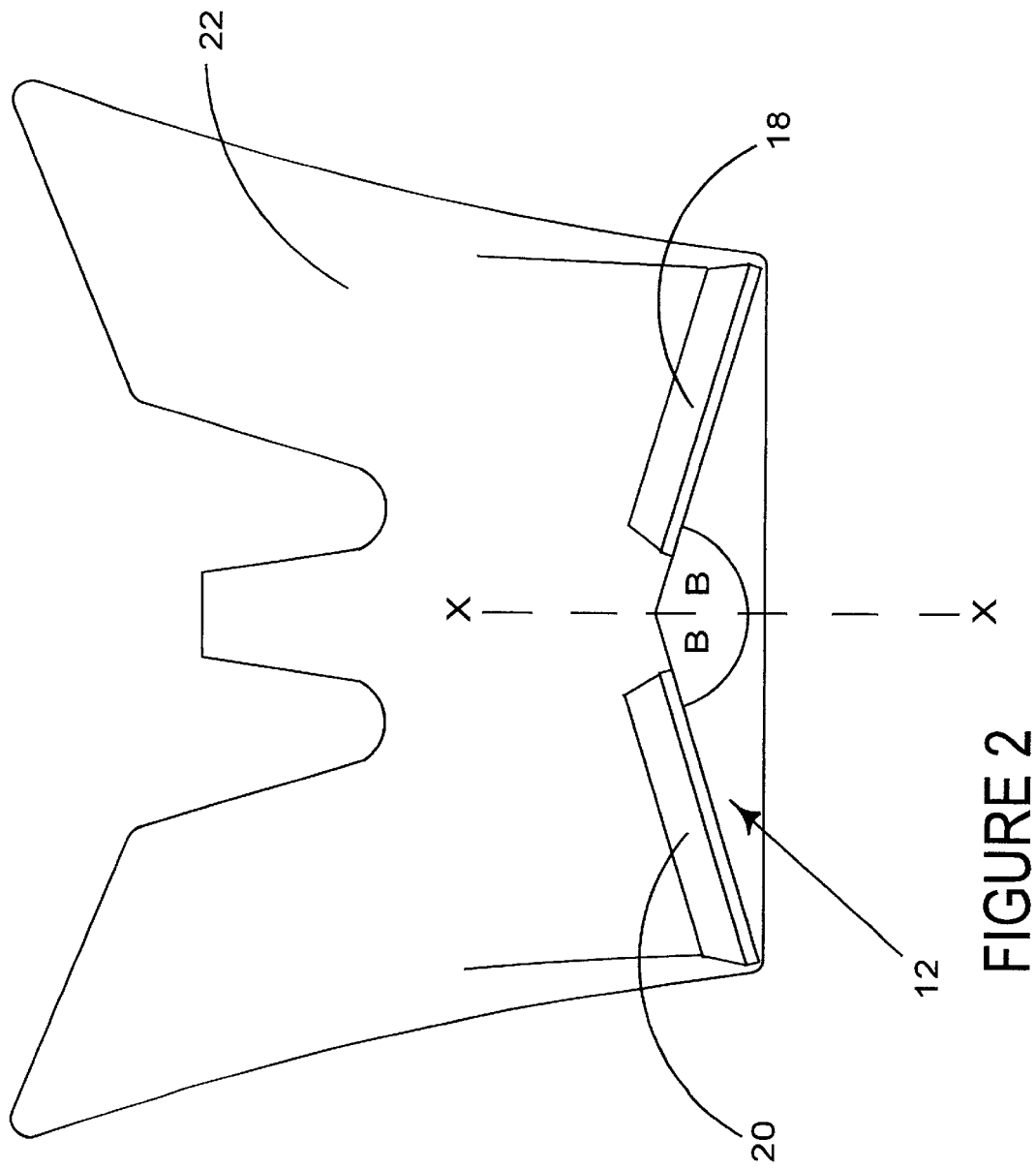
FIG. 2 is underside plan view of the preferred embodiment shown in FIG. 1.
Figure 5:
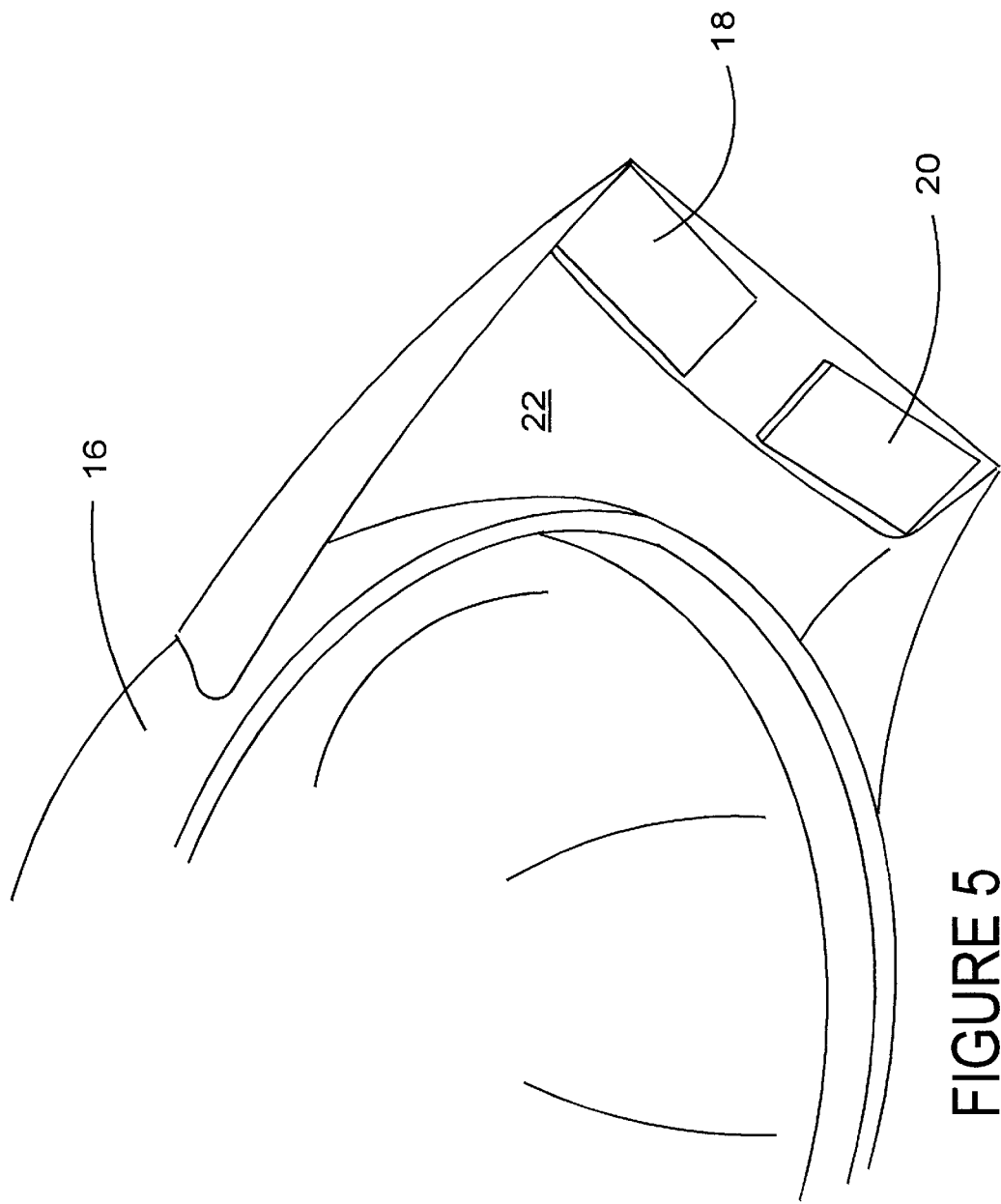
FIG. 5 is a perspective view from below and to one side of the preferred apparatus of the invention.

Referring to the drawings and in particular FIGS. 1, 2 and 5, there is illustrated a rear view apparatus according to a preferred embodiment of the present invention. The apparatus 10 comprises a mirror 12, a spacer element 14 for spacing the mirror from a user's head U and a connector 16 for connecting the spacer element 14 to the user's head. The mirror 12 is so constructed and arranged to provide a field of view behind and/or to one or both sides of the user.

The mirror is provided by one or more mirrored surfaces. In this embodiment, the mirror is provided with first and second mirrored surfaces 18, 20 that are positioned in front of the user's eyes, in use. Each mirrored surface is angled outwardly such that they are positioned in diverging planes. FIG. 2 shows one example of the arrangement of mirrored surfaces in which each surface is offset with respect to a notional plane X—X by an angle β. Preferably the angle β is in the range of 60 to 80 degrees. Optionally, the mirrored surfaces are spaced so that each mirror surface is placed in front of each one of the user's eyes.

An important aspect to the effective operation of the invention in reflecting the desired view is the position of the mirror with respect to the user's eyes. This is achieved by using a spacer element 14 connected to the mirror to space the mirror by a suitable distance 'd', shown in FIG. 3. The focal length of the user's eyes should be beyond the mirrors. In other words, the distance between the user's eyes and the mirror surfaces 16, 18 should be such as to allow the user to view different portions of the field through each eye.

Figure 3:
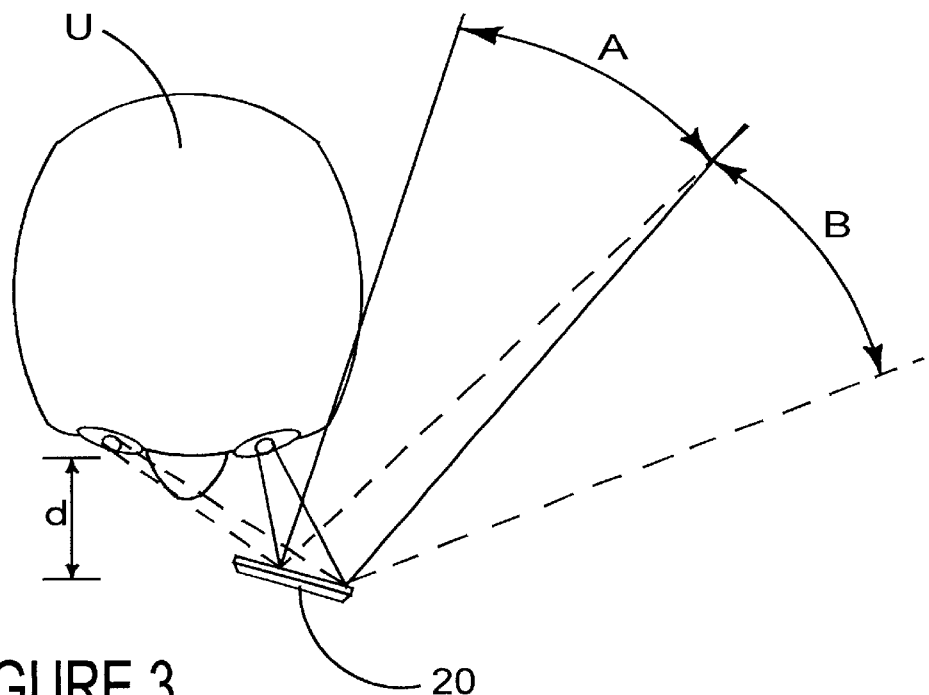
FIG. 3 is a top plan view of showing the orientation of the mirror of the preferred embodiment with respect to the user.
Figure 7:
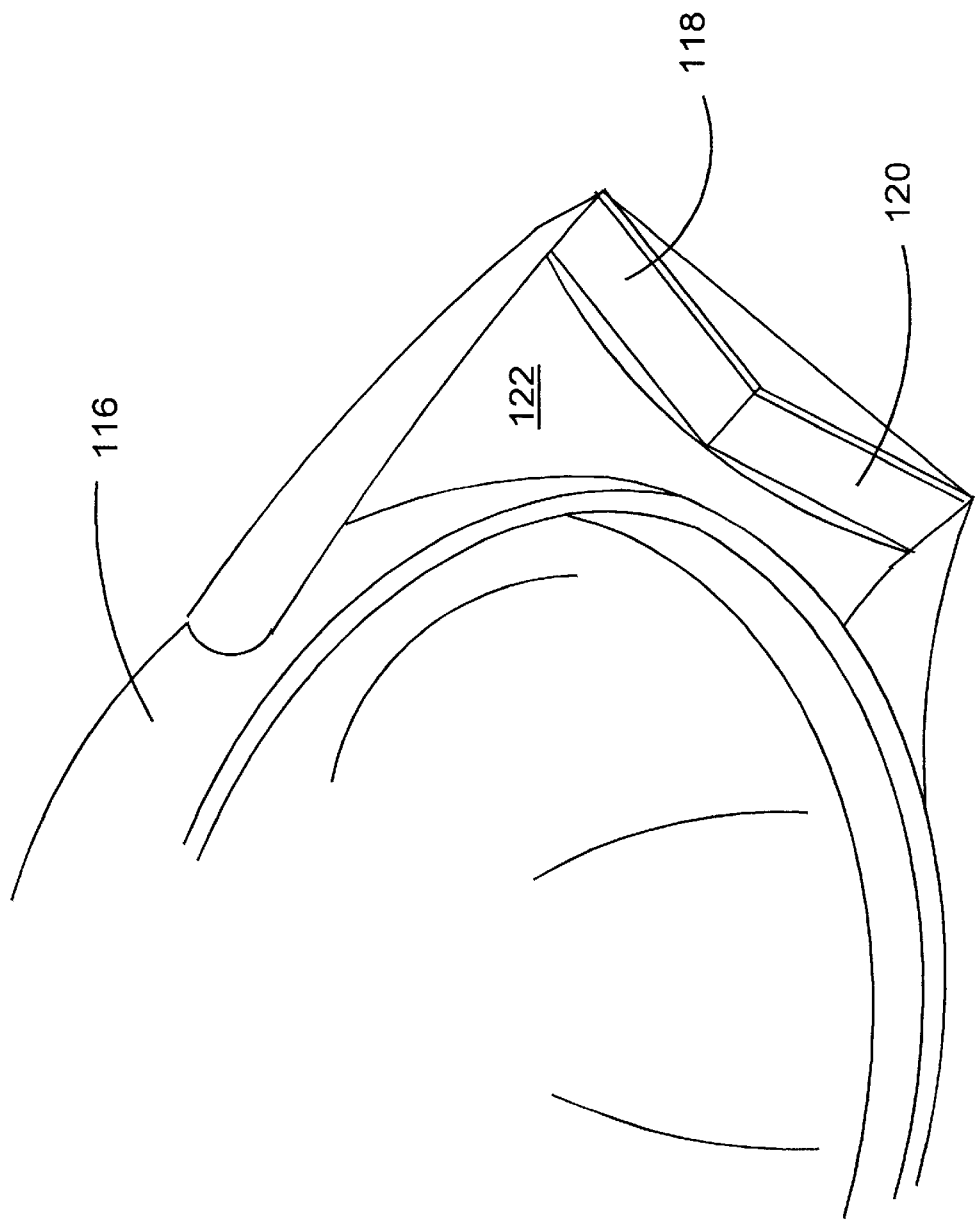
FIG. 7 is respective view from below and to one side of the preferred apparatus of the invention.
Figure 8:
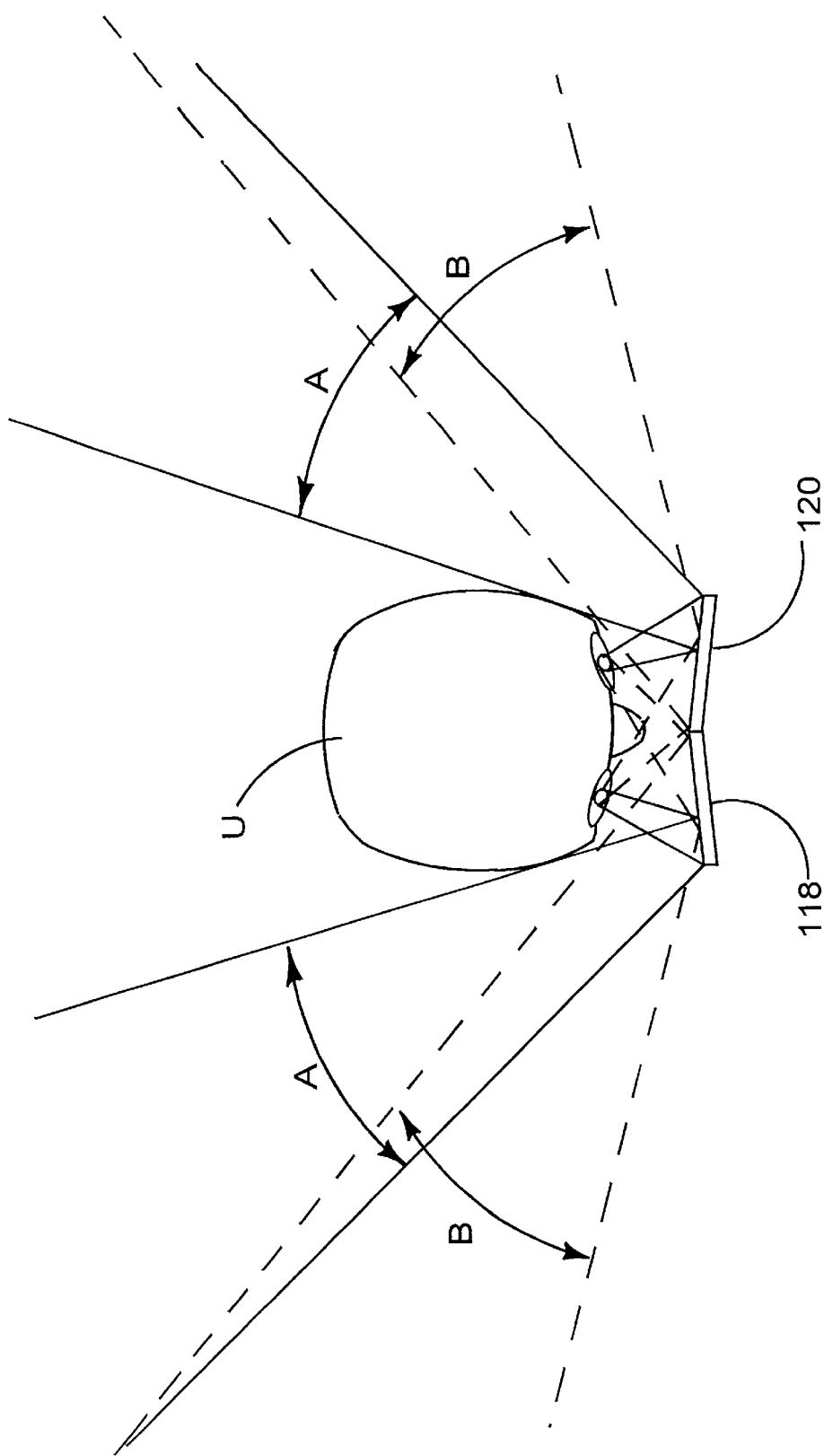
FIG. 8 is a top plan view of showing the orientation of the mirrors of the embodiments illustrated in FIGS. 5 and 7.

FIGS. 3 and 7 illustrates this aspect in more detail. The left eye views the reflected portion A of the field of view and the right eye views a different reflected portion B of the field because the angle of incidence differs for each eye. Thus, an object appearing in the field of view will be viewed through the left or right eyes or both eyes if the object is particularly close. In this embodiment, the distance d is in the range of about 5 cm to 13 cm, but the preferred distance is about 8 cm, although other distances would be suitable without departing from the scope of invention. By adopting other distances or other positions, the field of view and/or the view of each eye can be altered according to user requirements.

In this embodiment, the spacer element is provided by a visor 22, as shown in FIGS. 1 and 2. A suitable connector is provided to connect the spacer element to the user's head. As shown in FIG. 1, the visor is detachably connected to a helmet by a suitable fastener, for example by a hook and barb fastener, glue or mechanical means, known in the art. In other embodiments, the visor is fixedly mounted to the helmet to provide an integral unit. It is envisaged that the invention can be supplied as an integral part of a helmet or as a separate visor to be applied to a helmet on a retrofit basis.

The spacer element may further include one or more apertures or recessed portions 38 to improve the air-flow around the mirror surfaces, thereby to reduce the risk of condensation formation in certain conditions.

It is envisaged that the connector could be provided by an elasticated band sized to fit around the user's head to retain the visor 22. In other embodiments, the visor is connected to a motorcycle helmet.

Figure 4:
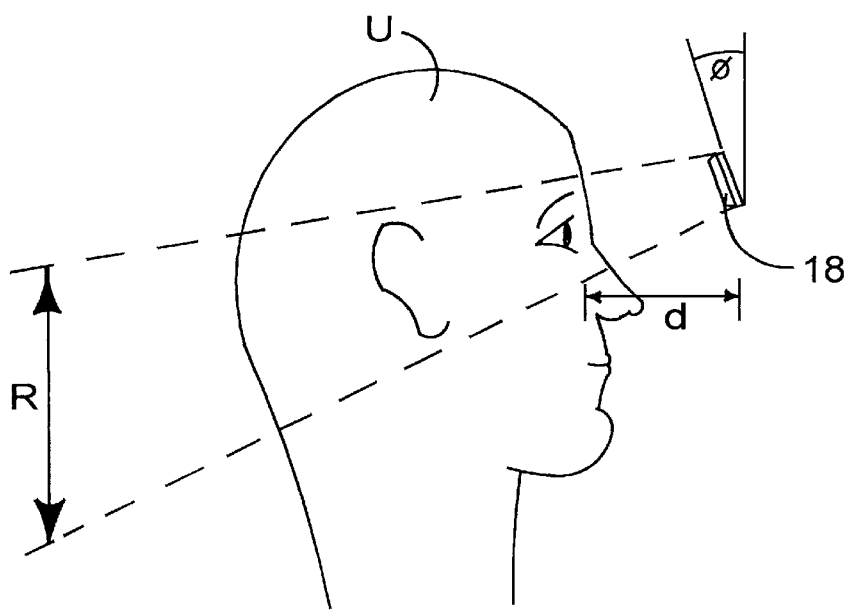
FIG. 4 is side elevation of the user and mirror shown in FIG. 3.

For some applications, for example cycling, the mirror surfaces are offset from the vertical plane so that the mirrors enable a user to view the desired view behind, as shown in FIG. 4. To assist with minor adjustment, the mirrors can be mounted to the visor by suitable pivot means, for example a ball and socket, or a cam arrangement, as is well known. In the embodiment shown in FIG. 4, the offset angle φ is about 10 degrees although the preferred angle is not important as it depends upon the particular application.

The mirror surfaces may be convex if it is desired to broaden the field of view, although it is preferred to use a planar mirror because it provides a clear and undistorted reflection of the image behind or to one side of the user.

Figure 6:
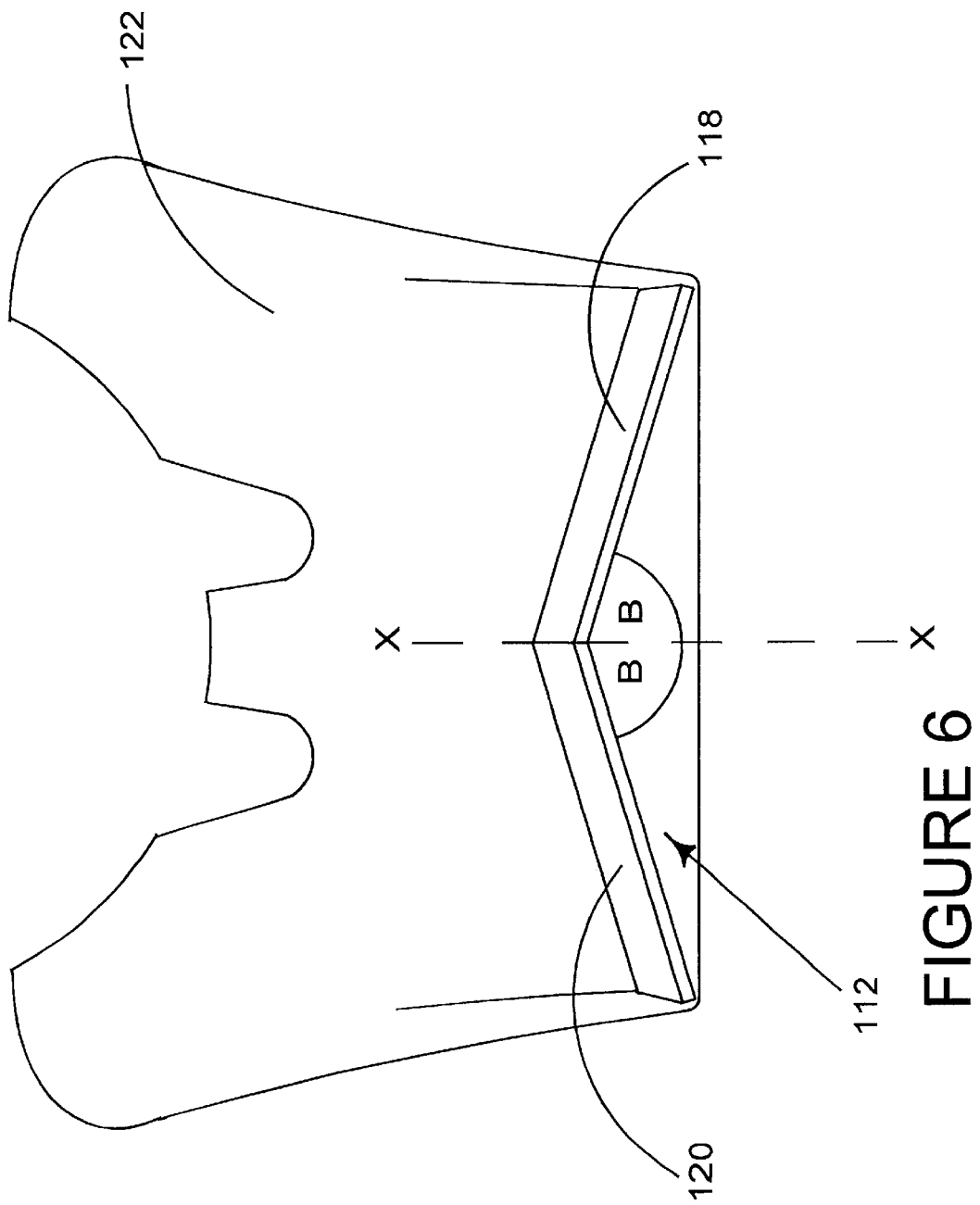
FIG. 6 is a plan view of a second embodiment of the invention.

The embodiments hereinbefore described show a mirror with a pair of mirror surfaces, although it is envisaged that only one mirror surface could be used. The second embodiment illustrated in FIGS. 6 and 7 is similar to the first embodiment with like features being designated by the same reference numerals but prefixed with the reference numeral '1'. Therefore only the differences will be described in any greater detail. It will be seen that the mirror surfaces 118 and 120 are arranged to intersect. Preferably, the point of intersection is in a central region, although it is envisaged that it could be positioned to one side if desired.

In those embodiments which are required to provide a field of view directly behind the user, an additional mirror can be attached to the visor by a clip or a known fixing means. The additional mirror is so positioned from the user's eyes to reflect the view directly behind. Of course in the embodiment illustrated in FIG. 1, the user is required merely to move his head slightly, to one side or the other, to see directly behind him. Beneficially, this arrangement enables a user to have a field of view beyond the focal length rather than an interrupted field with the first embodiment, thus the user's eyes are not required to refocus when moving from one surface to the other.

In trials, it has been proved that the embodiment of the invention, shown in FIG. 1, enables provision of rear view apparatus which is effective at allowing a user to view behind and to each side of him without any noticeable eye strain. Furthermore the user is not required to turn his head to view objects behind him which leads to improved safety.

In contrast with prior art systems that space the mirror by sufficient distance to view the same field through both eyes i.e. beyond the focal length of the eyes, the preferred embodiment of this invention has spaced the mirror from the eyes so that each eye views a different portion of the field. Beneficially, this approach results in a broader field of view.

It will, of course, be appreciated that the above description has been given by way of example only and that modifications in detail may be made within the scope of the present invention. While the embodiment of the present invention is generally described in relation to an apparatus and helmet, the arrangement and spacing of the or each mirror is universal in application. For example it can be applied to a visor, an eye shield, goggles, glasses or a face shield without departing from the scope of invention.

What is claimed is:

1. Apparatus for providing a rear view for a user comprising a mirror, a spacer element for spacing the mirror from the user's head and a connector for connecting the spacer element to the user's head, wherein the mirror comprises first and second adjacent mirror surfaces, and the first and second mirror surfaces diverge outwardly from the user so that they are adapted to provide a field of view behind and to both sides of the user and are positioned forward of the user's head such that the first and second mirror surfaces can each be viewed by both of the user's eyes and each eye views a different portion of said field of view through each mirror surface, and wherein the first and second mirror surfaces are in abutment along a common first edge to provide a continuous mirror surface.

2. The apparatus as claimed in claim 1 wherein the first and second mirror surfaces are angled from a notional plane parallel to the user's eyes in the range of 10 to 30 degrees.

3. The apparatus as claimed in claim 2 wherein the mirror is so positioned as to be inclined to the vertical plane.

4. The apparatus as claimed in claim 1 wherein the spacer element is provided by a visor extending forward beyond and above the user's eyes.

5. The apparatus as claimed in claim 4 wherein the spacer element spaces the mirror from the user's eyes by a distance in the range of 5 cm to 13 cm.

6. The apparatus as claimed in claim 5 wherein the spacing distance is 10 cm.

7. The apparatus as claimed in claim 4 wherein the connector is a helmet and the visor is integral with the helmet.

8. The apparatus as claimed in claim 1 wherein the connector is a helmet and the spacer element is detachably connected to the helmet.

9. The apparatus as claimed in claim 1 wherein the first and second mirror surfaces are positioned within the close focus of each of the user's eyes.

* * * * *